United States Patent
Kumar et al.

(10) Patent No.: US 11,263,923 B2
(45) Date of Patent: Mar. 1, 2022

(54) VASCULATURE MODELS AND ASSOCIATED SYSTEMS AND METHODS

(71) Applicant: Covidien LP, Mansfield, MA (US)

(72) Inventors: Tejashri Kumar, Fountain Valley, CA (US); Hoai Nguyen, Westminster, CA (US); John Wainwright, Foothill Ranch, CA (US); Evan Epstein, Los Angeles, CA (US); Gaurav Girdhar, Ladera Ranch, CA (US); Ujwal Jalgaonkar, Irvine, CA (US); Eric Mintz, Newport Coast, CA (US)

(73) Assignee: COVIDIEN LP, Mansfield, MA (US)

( * ) Notice: Subject to any disclaimer, the term of this patent is extended or adjusted under 35 U.S.C. 154(b) by 300 days.

(21) Appl. No.: 16/662,901

(22) Filed: Oct. 24, 2019

(65) Prior Publication Data

US 2021/0125525 A1    Apr. 29, 2021

(51) Int. Cl.
*G09B 23/30* (2006.01)
*G09B 23/32* (2006.01)

(52) U.S. Cl.
CPC ........... *G09B 23/303* (2013.01); *G09B 23/32* (2013.01)

(58) Field of Classification Search
CPC ...... G09B 23/28; G09B 23/30; G09B 23/303; G09B 23/32
See application file for complete search history.

(56) References Cited

U.S. PATENT DOCUMENTS

| | | | |
|---|---|---|---|
| 8,408,918 B2 | 4/2013 | Hu et al. | |
| 9,053,641 B2* | 6/2015 | Samosky | G09B 23/30 |
| 10,743,942 B2* | 8/2020 | Foster | A61B 5/0082 |
| 2001/0055748 A1* | 12/2001 | Bailey | G09B 23/285 434/262 |
| 2005/0181342 A1 | 8/2005 | Toly | |
| 2009/0123896 A1 | 5/2009 | Hu et al. | |
| 2009/0125100 A1* | 5/2009 | Mead | A61F 2/07 623/1.35 |
| 2014/0377731 A1 | 12/2014 | Conrad et al. | |
| 2016/0247418 A1 | 8/2016 | Folzenlogen et al. | |
| 2019/0340956 A1* | 11/2019 | Lindkvist | G09B 23/286 |

FOREIGN PATENT DOCUMENTS

| | | |
|---|---|---|
| CN | 205302800 U | 6/2016 |
| EP | 3046093 A1 | 7/2016 |
| EP | 3363480 A1 | 8/2018 |

OTHER PUBLICATIONS

International Search Report and Written Opinion dated Feb. 2, 2021, International Application No. PCT/US20/55457, 10 pages.

* cited by examiner

*Primary Examiner* — Kurt Fernstrom
(74) *Attorney, Agent, or Firm* — Fortem IP LLP; Matthew Lincicum

(57) ABSTRACT

Vasculature models and associated systems and methods are disclosed herein. In some embodiments, the model comprises a tube including a lumen extending therethrough, a synthetic thrombus including a magnetic component, and a magnetized member. The thrombus is sized to be positioned within the lumen, and the magnetized member is positioned peripheral to the thrombus such that a radially outward force is exerted on the thrombus via the magnetized member. The tube may be part of a network of tubes that generally resemble human neurovasculature.

20 Claims, 5 Drawing Sheets

VASCULATURE MODELS AND ASSOCIATED SYSTEMS AND METHODS

TECHNICAL FIELD

The present technology relates to vasculature models, and in particular embodiments, to vasculature models resembling a portion of the human vasculature.

BACKGROUND

Endovascular treatment using stent-type clot or thrombus retrievers or catheter aspiration systems has become the standard of care for restoring flow in large vessel occlusions. However, due to numerous factors (e.g., tortuous anatomy, pressurized blood flow, variation in thrombus properties, variation in adhesion between thrombus and vessel wall, etc.), there are instances of loss of emboli or only partial removal of thrombus during the retrieval process. As a result, investigating adhesion properties between the thrombus and vessel wall may be a key component of neurovascular device development. Current benchtop clot retrieval models have been generally unable to simulate the interaction between the clot and vessel wall at the site of the occlusion. This has led to benchtop testing that generally shows inaccurate clot retrieval efficacy. For example, current benchtop clot retrieval models generally show greater clot retrieval efficacy of flow restoration devices relative to in vivo clinical data, and have not been predictive in differentiating efficacy between treatment devices. For at least this reason, there is a growing need to develop improved benchtop models that more accurately resemble in vivo adhesion between the clot and vessel wall to evaluate performance of neurovascular devices.

SUMMARY

The present technology relates to devices, systems, and methods for simulating medical procedures and/or devices in vitro. Aspects of the present technology include a vasculature model which, in some embodiments, comprise one or more tubes, a synthetic thrombus including a magnetic component, and a magnetized member. The synthetic thrombus may be positioned within a lumen of the one or more tubes, and the magnetized member may be positioned adjacent the thrombus peripheral to the lumen. In such embodiments, the magnetized member may exert a resistive force (e.g., a radially outward force) on the thrombus, and thereby secure the thrombus at a particular location along the one or more tubes. Securing the thrombus in such a manner may generally resemble the in vivo interaction between an actual thrombus and blood vessel wall.

The present technology is illustrated, for example, according to various aspects described below. Various examples of aspects of the present technology are described as numbered clauses (1, 2, 3, etc.) for convenience. These are provided as examples and do not limit the present technology. It is noted that any of the dependent clauses may be combined in any combination, and placed into a respective independent clause (1, 17, 47, etc.). The other clauses can be presented in a similar manner.

1. A synthetic thrombus, comprising
   thrombin;
   fibrinogen and/or fibrin; and
   a magnetic component.
2. The thrombus of clause 1, further comprising a bodily fluid.
3. The thrombus of clause 1, wherein the bodily fluid is human bodily fluid.
4. The thrombus of clause 1, wherein the bodily fluid is animal bodily fluid.
5. The thrombus of clause 4, wherein the animal bodily fluid is porcine or bovine blood including red blood cells and platelets.
6. The thrombus of clause 1, wherein the bodily fluid is mammalian bodily fluid.
7. The thrombus of clause 1, further comprising a wholly or partially synthetic material not derived from blood or bodily fluid.
8. The thrombus of clause 7, wherein the synthetic material comprises a polymer, wax, gelatin, collagen, gel, hydrogel, polymeric solid foam material, non-polymeric solid foam material, and/or combinations thereof.
9. A synthetic thrombus, comprising
   a matrix material; and
   a magnetic component disposed and/or suspended in the matrix material.
10. The thrombus of clause 9, wherein the matrix material is at least partially derived from bodily fluid.
11. The thrombus of clause 9, wherein the matrix material is not derived from bodily fluid.
12. The thrombus of clause 11, wherein the matrix material comprises a polymer, wax, gelatin, collagen, gel, hydrogel, polymeric solid foam material, non-polymeric solid foam material, and/or combinations thereof.
13. The thrombus of any one of the previous clauses, wherein the magnetic component comprises iron.
14. The thrombus of any one of the previous clauses, wherein the magnetic component comprises nickel, cobalt, aluminum, iron, boron and/or alloys thereof.
15. The thrombus of any one of the previous clauses, wherein the magnetic component comprises neodymium.
16. The thrombus of any one of the previous clauses, wherein the magnetic component comprises an electromagnet.
17. The thrombus of any one of the previous clauses, wherein the magnetic component comprises ferric oxide ($Fe_2O_3$), iron oxide (FeO), magnetite ($Fe_3O_4$), and/or alloys thereof.
18. The thrombus of any one of the previous clauses, wherein the magnetic component comprises a ferromagnetic material.
19. The thrombus of any one of the previous clauses, further comprising a cross-linking agent.
20. The thrombus of clause 19, wherein the cross-linking agent comprises amine, epoxy, and/or aldehyde.
21. The thrombus of any one of the previous clauses, wherein the magnetic component comprises or is a powder.
22. The thrombus of clause 21, wherein individual particles of the powder have a mean particle size of at least 10 nanometers (nm), 25 nm, 50 nm, 100 nm, 250 nm, 500 nm, 1 micron, 10 microns, 20 microns, 30 microns, 40 microns, or 50 microns.
23. The thrombus of any one of clauses 21 or 22, wherein individual particles of the powder have a mean particle size no greater than 50 microns, 40 microns, 30 microns, 20 microns, 10 microns, 1 micron, 500 nanometers (nm), 250 nm or 100 nm.

24. The thrombus of any one of clauses 21-23, wherein individual particles of the powder have a mean particle size within a range of 10-50 microns.
25. The thrombus of any one of clauses 21-24, wherein the powder comprises at least 0.5 grams (g), 1.0 g, 1.5 g, 2.0 g, 2.5 g, or 3.0 g of the thrombus.
26. The thrombus of any one of clauses 21-25, wherein the powder comprises at least 10%, 15%, 20%, 25%, 30%, 35%, 40%, 45%, or 50% by weight of the thrombus.
27. The thrombus of any one of the preceding clauses, wherein the thrombus has a compression modulus of at least 0.06 megapascals (MPa), 0.08 MPa, 0.10 MPa, 0.12 MPa, 0.14 MPa, 0.16 MPa, 0.18 MPa, or 0.20 MPa.
28. The thrombus of any one of the preceding clauses, wherein the thrombus has a compression modulus within a range of 0.06-0.20 megapascals.
29. The thrombus of any one of the previous clauses, wherein the magnetic component includes a magnetic field of at least 1.0 millitesla (mT), 10 mT, 50 mT, 100 mT, 200 mT, 300 mT, 400 mT, 500 mT, 600 mT, 700 mT, 800 mT, 900 mT or 1 Tesla.
30. The thrombus of clause 25, wherein the magnetic field is measured at a distance of 10 millimeters or less from an outer surface of the magnetic component.
31. The thrombus of any one of the previous clauses, wherein the thrombus comprises a radial outermost dimension of at least 1 millimeters (mm), 2 mm, 3 mm, or 4 mm.
32. The thrombus of any one of the previous clauses, wherein the thrombus comprises a longitudinal length of at least 5 millimeters (mm), 10 mm, or 15 mm.
33. A neurovasculature model, comprising:
a tube including a lumen extending therethrough;
a synthetic thrombus located within the lumen of the tube, the thrombus being that of any one of the previous clauses; and
a magnetized member positioned adjacent the thrombus and/or peripheral to the lumen, the magnetized member being configured to exert a radially outward magnetic force on the magnetic component of the thrombus.
34. The model of clause 33, wherein the thrombus is secured to the tube via the magnetized member such that the thrombus can withstand a dislodging force provided via a recirculated fluid within the tube.
35. The model of any one of the previous clauses, wherein the dislodging force is at least 0.05 Newtons (N).
36. The model of any one of the previous clauses, wherein the dislodging force is within a range of from 0.05-0.10 Newtons (N).
37. The model of any one of the previous clauses, wherein the tube is part of a plurality of tubes having a tortuous configuration.
38. The model of any one of the previous clauses, wherein the tube is shaped to generally mimic a portion of the neurovasculature of a human body.
39. The model of any one of the previous clauses, wherein the tube includes a portion shaped to mimic the carotid siphon.
40. The model of any one of the previous clauses, wherein the tube comprises silicone, acrylic, glass, and/or combinations thereof.
41. The model of any one of the previous clauses, wherein the tube has an inner diameter of at least 1 millimeters (mm), 2 mm, 3 mm, or 4 mm.
42. The model of any one of the previous clauses, wherein the tube comprises the magnetized member.
43. The model of any one of the previous clauses, wherein the tube comprises a tube wall, and wherein the magnetized member is positioned entirely within the tube wall such that no portion of the magnetized member protrudes therefrom.
44. The model of any one of the previous clauses, wherein the tube comprises an outermost surface and an innermost surface, and wherein the magnetized member is positioned within the tube such that no portion of the magnetized member protrudes through the innermost surface of the tube.
45. The model of any one of the previous clauses, wherein the tube comprises an outermost surface and an innermost surface, and wherein the magnetized member is positioned within the tube such that a portion of the magnetized member is exposed through the outermost surface of the tube.
46. The model of any one of the previous clauses, wherein the tube comprises a tube wall, and wherein the magnetized member is positioned at least partially within the tube wall.
47. The model of any one of the previous clauses, wherein:
the thrombus is positioned at a target site, and
the magnetized member comprises iron powder dispersed within a tube wall of the tube at or adjacent to the target site.
48. The model of any one of the previous clauses, wherein the magnetized member surrounds a circumference of the tube.
49. The model of any one of the previous clauses, wherein the magnetized member surrounds only a portion of a circumference of the tube.
50. The model of any one of the previous clauses, wherein the magnetized member comprises iron.
51. The model of any one of the previous clauses, wherein the magnetized member comprises iron, nickel, cobalt, aluminum, boron, and/or alloys thereof.
52. The model of any one of the previous clauses, wherein the magnetized member comprises neodymium.
53. The model of any one of the previous clauses, wherein the magnetized member comprises an electromagnet.
54. The model of any one of the previous clauses, wherein the magnetized member comprises ferric oxide ($Fe_2O_3$), iron oxide (FeO), magnetite ($Fe_3O_4$), and/or alloys thereof.
55. The model of any one of the previous clauses, wherein the magnetized member comprises a ferromagnetic material.
56. The model of any one of the previous clauses, wherein the magnetized member comprises or is a powder.
57. The model of clause 56, wherein individual particles of the powder have a mean particle size of at least 10 nanometers (nm), 25 nm, 50 nm, 100 nm, 250 nm, 500 nm, 1 micron, 10 microns, 20 microns, 30 microns, 40 microns, or 50 microns.
58. The model of any one of clauses 56 or 57, wherein individual particles of the powder have a mean particle size no greater than 50 microns, 40 microns, 30 microns, 20 microns, 10 microns, 1 micron, 500 nanometers (nm), 250 nm or 100 nm.
59. The model of any one of clauses 56-58, wherein individual particles of the powder have a mean particle size within a range of 10-50 microns.

60. The model of any one of the clauses 56-59, wherein the powder comprises at least 0.5 grams (g), 1.0 g, 1.5 g, 2.0 g, 2.5 g, 3.0 g of the magnetized member.
61. The model of any one of clauses 56-60, wherein the powder comprises at least 10%, 15%, 20%, 25%, 30%, 35%, 40%, 45%, or 50% by weight of the magnetized member.
62. The model of any one of the previous clauses, wherein the magnetized member has a magnet grade of N42, N48, N52, or N42SH.
63. The model of any one of the previous clauses, wherein the magnetized member includes a magnetic field of at least 1.0 millitesla (mT), 10 mT, 50 mT, 100 mT, 200 mT, 300 mT, 400 mT, 500 mT, 600 mT, 700 mT, 800 mT, 900 mT or 1000 mT.
64. The model of clause 63, wherein the magnetic field is measured at a distance of 10 millimeters or less from a face of the magnetic component.
65. A neurovasculature model, comprising:
a tube including a lumen extending therethrough;
a synthetic thrombus located within the lumen of the tube, the thrombus being electrically charged with a first polarity; and
an electrically charged member positioned adjacent the thrombus and/or peripheral to the lumen, the electrically charged member having a second polarity opposite the first polarity.
66. The model of clause 65, wherein the first and second polarities cause a resistive force applied on the thrombus via the member.
67. The model of any one of clauses 65 or 66, wherein the tube is that of any one of the previous clauses and the thrombus is that of any one of the previous clauses.
68. A method for simulating a medical procedure, comprising:
providing a tube, the tube being that of any one of the previous clauses;
positioning a thrombus within the lumen of the tube at a target site, the thrombus being that of any one of the previous clauses; and
securing the thrombus at the target site via a magnetized member, the magnetized member being that of any one of the previous clauses.
69. The method of clause 68, further comprising flowing fluid through the tube via a pump.
70. The method of clause 69, wherein the fluid is pressurized to be at least 50 millimeters of mercury (mmHg), 75 mmHg, 100 mmHg, 120 mmHg, 140 mmHg, 160 mmHg, or 180 mmHg, or within a range from 50 mmHg to 180 mmHg.
71. The method of any one of clauses 69 or 70, wherein the flowing fluid provides a force on the thrombus of at least 0.05 Newtons (N), the method further comprising withstanding the force such that the thrombus remains secured at the target site.
72. The method of any one of the previous clauses, wherein the thrombus substantially occludes the lumen of the tube.
73. The method of any one of the previous clauses, further comprising removing the thrombus from the tube via a retrieval device.
74. A method for simulating a medical procedure, comprising:
providing a tube, the tube being that of any one of the previous clauses;
positioning a thrombus within the lumen of the tube at a target site, the thrombus being electrically charged with a first polarity; and
securing the thrombus at the target site via an electrically charged member, the member having a second polarity opposite the first.
75. The method of clause 74, wherein securing comprises securing the thrombus via a resistive force caused via the first and second polarities.
76. A system, comprising:
the model of any one of the previous clauses; and
a pump configured to circulate fluid through the tube of the model.
77. The system of clause 76, further comprising a device configured to remove the thrombus from the tube of the model.
78. The system of any one of the previous clauses, wherein the device comprises a stentriever or aspiration catheter.
79. A kit, comprising:
the tube of any one of the previous clauses;
the thrombus of any one of the previous clauses; and
the magnetized member of any one of the previous clauses.
80. The kit of clause 79, further comprising a pump configured to flow or circulate fluid through the tube of the model.
81. The kit of any one of the previous clauses, further comprising a device configured to remove the thrombus from the tube of the model.
82. The kit of any one of the previous clauses, wherein the device comprises a stentriever or aspiration catheter.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

The present technology relates to devices, systems, and methods for simulating, testing, or evaluating medical procedures and/or devices in vitro. Although many of the embodiments are described below with respect to devices, systems, and methods relating to simulating medical procedures and/or devices related to cerebral or intracranial embolism, other applications and other embodiments in addition to those described herein are within the scope of the present technology. For example, the devices, systems, and methods of the present technology may be used to simulate, test, or evaluate medical procedures and/or devices related to removing emboli from other body lumens other than blood vessels (e.g., the digestive tract, urinary tract, respiratory tract, etc.) and/or may be used to remove luminal obstructions other than clot material (e.g., plaque, resected tissue, foreign material, etc.).

I. Embodiments of Vasculature Models and Associated Systems and Methods

Figure 1A:
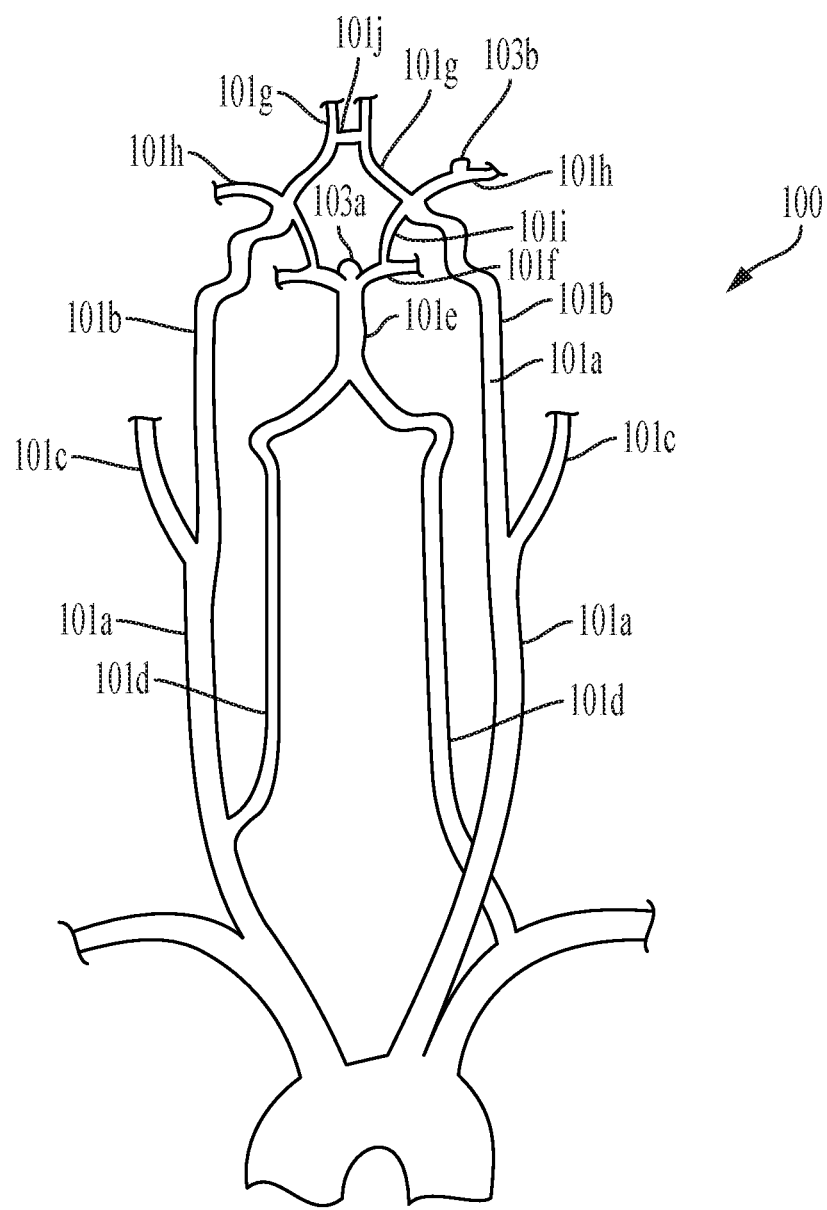
FIG. 1A is a partially schematic model of a portion of human vasculature, in accordance with embodiments of the present technology.
Figure 1B:
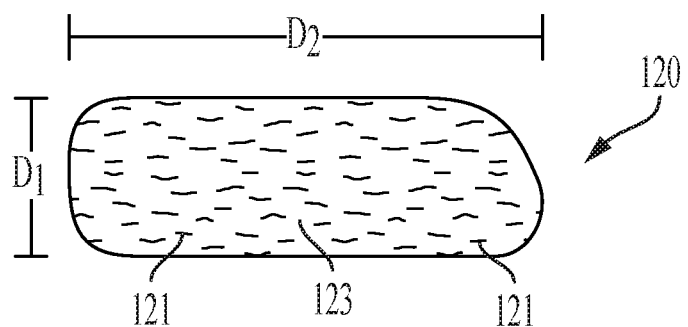
FIG. 1B is a partially schematic side view of a synthetic thrombus, in accordance with embodiments of the present technology.
Figure 1C:
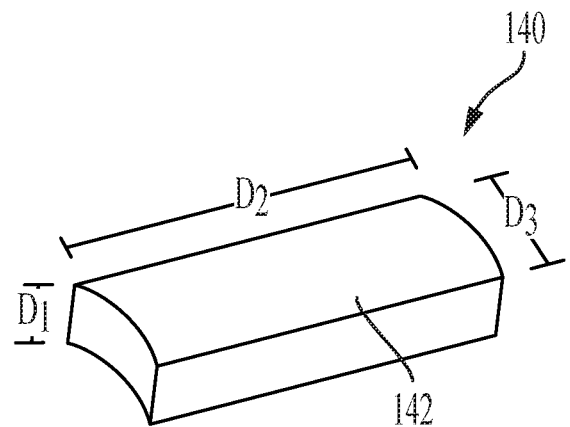
FIGS. 1C and 1D are partially schematic isometric views of a magnetized member, in accordance with embodiments of the present technology.

FIGS. 1A-1C are partially schematic views of a model of a portion of human vasculature 100 ("model 100"), synthetic thrombus 120 ("thrombus 120"), and magnetized member 140, respectively, in accordance with embodiments of the present technology. As described elsewhere herein (e.g., with reference to FIGS. 2A-2C), the thrombus 120 may be disposed within the model 100, and the magnetized member 140 is configured to be disposed on or within the model 100 peripheral to the thrombus 120. Referring to FIG. 1A, the model 100 includes a network of tubes 101a-j (collectively referred to as "tubes 101") having a particular shape, size and/or tortuous configuration, e.g., to generally resemble the human neurovasculature or a portion thereof (e.g., the cerebral blood vessels). Alternatively, the model 100 could be configured as the blood vessels of any other part of the body, e.g., the pulmonary, coronary, abdominal, cervical, thoracic, or peripheral blood vessels, etc. As shown in FIG. 1A, for example, the tubes 101 include a first portion 101a which may resemble the common carotid artery in the neck, a second portion 101b which may resemble the internal carotid artery, a third portion 101c which may resemble the external carotid artery, a fourth portion 101d which may resemble the vertebral artery, a fifth portion 101e which may resemble the basilar artery, a sixth portion 101f which may resemble the posterior cerebral artery, a seventh portion 101g which may resemble the anterior cerebral artery, an eight portion 101h which may resemble the middle cerebral artery, a ninth portion 101i which may resemble the posterior communicating artery, and a tenth portion 101j which may resemble the anterior communicating artery. The model 100 can also include one or more aneurysms formed in the sidewall(s) of the tube(s). As shown in FIG. 1A, the model 100 includes a first aneurysm 103a positioned adjacent a bifurcated portion of the tubes 101, and a second aneurysm 103b positioned along the eight portion 101h of tubes 101.

The model 100 shown in FIG. 1A is one of many embodiments of models (e.g., vascular or anatomical models) of the present disclosure. In other embodiments, the model 100 can include more or fewer tubes 101, and/or resemble more, fewer, or other parts of the neurovasculature than that shown in FIG. 1A. For example, in addition to or in lieu of the vasculature described elsewhere herein, the model 100 can include the middle cerebral artery (MCA) and/or arterial cerebral artery (ACA). As explained in additional detail elsewhere herein, by generally resembling the human neurovasculature, the model 100 can be utilized to simulate, practice and/or test medical procedures and/or devices to be utilized in vivo in actual patients. For example, models of the present disclosure can be designed to simulate removal of occlusions to treat ischemic strokes, e.g., via endovascular treatment using stent retrievers (or other retriever devices) and/or catheter aspiration systems. As another example, models of the present disclosure can be designed to simulate stent or other medical implant delivery, e.g., via transfemoral delivery, transapical delivery, transaortic delivery, transcarotid delivery, or other commonly used delivery techniques for implanting medical devices. In such embodiments, the models of the present disclosure can include tubes that resemble the anatomy (e.g., blood vessels, organs, etc.) of the delivery pathway.

The tubes 101 can be made of any suitable plastic or synthetic polymer material, such as silicone or acrylic, or glass, or combinations of materials. The tubes 101 include a lumen extending therethrough which can vary in size, e.g., to resemble the corresponding in vivo blood vessel lumen. In some embodiments, the lumens of individual tubes have a diameter or cross-sectional dimension (i) of at least 1 millimeter (mm), 2 mm, 3 mm, 4 mm, 5 mm, or 6 mm, or (ii) within a range of 1-6 mm, or other incremental ranges (e.g., 1-3 mm, 4-6 mm, etc.) between this range, or larger. The tubes 101 may be formed as an integral unit (e.g., a single component) such that the tubes 101 have a continuous surface, or the tubes 101 may be a plurality of separate tubes joined together, e.g., via friction, couplings, adhesives, etc.

As previously mentioned, FIG. 1B is a partially schematic view of the thrombus 120. As shown in FIG. 1B, the thrombus 120 itself can comprise a thrombus material matrix or body, which can be formed of a human or animal blood-derived material, a non-blood-derived material, or a partially or wholly synthetic material, as will be described in further detail below. The thrombus 120 can further include one or more magnetic components 121 ("magnetic component 121") such as neodymium, nickel, cobalt, aluminum, boron, and/or alloys thereof. In some embodiments, the magnetic component 121 can include iron, such as ferric oxide ($Fe_2O_3$), iron oxide (FeO), magnetite ($Fe_3O_4$), derivatives thereof, or alloys thereof. Additionally or alternatively, the magnetic component 121 may include an electromagnet, a ferrimagnetic material, or a ferromagnetic material. In some embodiments, the amount of magnetic component 121 included in the thrombus can be (i) at least 0.5 grams (g), 1.0 g, 1.5 g, 2.0 g, 2.5 g, or 3.0 g, or (ii) within a range of 0.5-3.0 g, or other incremental ranges between this range. In some embodiments, the weight percent of the magnetic component 121 to the weight of the thrombus can be (i) at least 10%, 20%, 30%, 40%, or 50%, or (ii) within a range of 10-50%, or other incremental ranges between this range. The amount or weight percent of the magnetic component 121 causes the thrombus 120 to have a particular modulus (e.g., compression modulus). The modulus of the thrombus 120 can be (i) at least 0.06 megapascals (MPa), 0.08 MPa, 0.10 MPa, 0.12 MPa, 0.14 MPa, 0.16 MPa, 0.18 MPa, or 0.20 MPa, or (ii) within a range of 0.06-0.20 MPa, or other incremental ranges between this range. In some embodiments, the magnetic component 121 (e.g., individual magnetic components or magnetic components in the aggregate) can provide a magnetic field (i) of at least 50 microtesla (µT), 100 µT, 250 µT, 500 µT, 1.0 milliteslas (mT), 1.5 mT, 2.0 mT, 2.5 mT, 3.0 mT, 3.5 mT, 4.0 mT, 4.5 mT, 5.0 mT, 10 mT, 20 mT, 30 mT, 40 mT, 50 mT, 60 mT, 70 mT, 80 mT, 90 mT, 100 mT, 200 mT, 300 mT, 400 mT, 500 mT, 600 mT, 700 mT, 800 mT, 900 mT or 1 Tesla (T), or (ii) within a range of 50 µT to 1 T, e.g., measured at a distance of 10 mm or less from a face of the magnetic component 121.

In some embodiments, the magnetic component 121 can take the form a powder. For example, the magnetic component 121 may be a plurality of ferric oxide particles in powder form. Individual particles of the powder can have a mean particle size (i) of at least 10 nanometers (nm), 25 nm, 50 nm, 100 nm, 250 nm, 500 nm, 1 micron, 10 microns, 20 microns, 30 microns, 40 microns, or 50 microns, or (ii) within a range of 10 nm-50 microns, or other incremental ranges between this range.

The thrombus 120 may be manufactured or designed to have a particular composition, size, shape, structural integrity, and/or the like, such that the thrombus 120 generally resembles an actual thrombus, clot or occlusive member developed in vivo. As such, in addition to the magnetic component 121, the thrombus 120 can include other components 123, such as (i) human or animal bodily fluid (e.g., porcine blood, bovine blood, or any mammalian animal blood), (ii) fibrinogen, fibrin and/or other proteins configured to promote hemostasis, and/or (iii) thrombin and/or other enzymes configured to promote the conversion of fibrinogen to fibrin. In some embodiments, the thrombus 120 can be a wholly or partially synthetic material, or other material(s) not derived from blood or bodily fluids, such as a polymer (preferably a soft, compressible and/or highly viscous polymer), wax, gelatin, collagen, gel, hydrogel, polymeric or non-polymeric solid foam materials, or combinations of the foregoing materials.

In some embodiments, the bodily fluid or synthetic material of the thrombus 120 can be or resemble a cross-linked network or matrix, and the magnetic component 121 (e.g., iron or ferric oxide particles) is physically dispersed and/or suspended within the cross-linked matrix. The cross-linking or polymerization of the matrix helps retain the magnetic component or particles in place within the matrix, reducing the possibility of the magnetic component being displaced to one edge of (or outside of) the matrix upon application of a magnetic force to the thrombus. Instead of or in addition to such cross-linking or polymerization, the magnetic component/particles can be chemically functionalized such that chemical bonds are formed between the component/particles and the thrombus matrix material. Such chemical bonding can provide an alternative or additional way to stabilize the position of the magnetic particles in the thrombus. These chemical bonds can be formed when the thrombus 120 is made, or they can be activated (e.g., magnetically activated) after the thrombus is made. For example, prior to a magnetic field or effect being applied to the magnetic component 121 and matrix, there is no chemical bonding between the particles and the matrix. Once a magnetic effect is applied to the magnetic component 121 and/or matrix, individual magnetic components are chemically functionalized such that pendant reactive groups form or become present on the surface of the individual magnetic components. The reactive groups can form chemical bonds with the matrix, which can enhance the compression modulus or bond strength amongst compounds of the thrombus 120.

As shown in FIG. 1B, the thrombus 120 can include a first dimension (e.g., a radial outermost dimension) $D_1$ (i) of at least 1 mm, 2 mm, 3 mm, 4 mm, 5 mm, or 6 mm, or (ii) within a range of 1-6 mm, or other incremental ranges (e.g., 1-3 mm, 4-6 mm, etc.) between this range. The thrombus 120 can also include a second dimension (e.g., a longitudinal dimension) $D_2$ (i) of at least 2 mm, 4 mm, 6 mm, 8 mm, 10 mm, 12 mm, or 14 mm, or (ii) within a range of 2-14 mm, or other incremental ranges between this range.

The thrombus 120 may be formed by mixing or infusing the individual components of the thrombus 120. In some embodiments, the magnetic component 121 (e.g., iron particles) is added to a solution of fibrin and/or fibrinogen, which is then combined with a bodily fluid (e.g., animal blood), and which is then combined with thrombin. The thrombin can cause cross linking to occur, thereby causing the thrombus 120 to obtain a particular modulus, as described elsewhere herein, and/or stabilize the position of the magnetic component/particles in the thrombus. Additionally, compounds including amine (e.g., pendant amine), epoxy, aldehyde, combinations thereof, and/or other reactive groups may be used to enhance or promote cross linking activity. In some embodiments, the bodily fluid and magnetic component and mixed prior to adding fibrinogen, and subsequently thrombin, thereto.

Figure 1D:
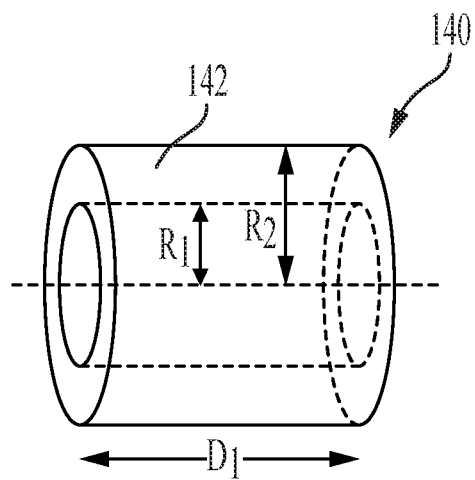

As previously mentioned, FIGS. 1C and 1D are partially schematic views of the magnetized member 140. Referring to FIGS. 1C and 1D together, the magnetized member 140 can include a magnetic component 142, which may include any of the magnetic components 121 (FIG. 1B) previously described. For example, the magnet component 142 can include iron, nickel, cobalt, aluminum, neodymium, ferric oxide ($Fe_2O_3$), iron oxide (FeO), magnetite ($Fe_3O_4$), derivatives thereof, alloys thereof, an electromagnet, a ferrimagnetic material, and/or a ferromagnetic material. In some embodiments, the magnetized member 140 can have a magnet grade of N42, N48, N52, or N-42SH. In some embodiments, the magnetized member 140 and/or magnetic component 142 can provide a magnetic field (i) of at least 50 µT, 100 µT, 250 µT, 500 µT, 1.0 mT, 1.5 mT, 2.0 mT, 2.5 mT, 3.0 mT, 3.5 mT, 4.0 mT, 4.5 mT, 5.0 mT, 10 mT, 20 mT, 30 mT, 40 mT, 50 mT, 60 mT, 70 mT, 80 mT, 90 mT, 100 mT, 200 mT, 300 mT, 400 mT, 500 mT, 600 mT, 700 mT, 800 mT, 900 mT or 1 T, or (ii) within a range of 50 µT to 1 T, measured at a distance of 10 mm or less from a face of the magnetized member 140

The magnetized member 140 can include a variety of shapes (e.g., rectangular, spherical, cylindrical, ring, etc.). As shown in FIG. 1C, in the rectangular shape the magnetized member 140 can include a first dimension $D_1$ (e.g., a thickness), a second dimension $D_2$ (e.g., a length), and a third dimension $D_3$ (e.g., a width). The first, second, and third dimensions $D_1$-$D_3$ may vary to ensure the magnetized member 140 has a sufficient volume and/or amount of magnetic component 142 to provide a magnetic force (e.g., magnetic field effect) above a predetermined threshold. The first dimension $D_1$ can be (i) less than 0.5 mm, 1 mm, 2 mm, 3 mm, or 4 mm, or (ii) within a range of 0.5-4 mm, or other incremental ranges between this range. As described in additional detail described elsewhere herein (e.g., with reference to FIGS. 2A-2C), the first dimension $D_1$ may be determined based on the thickness of the tube wall of the tubes 101. The second dimension $D_2$ can be (i) at least 2 mm, 4 mm, 6 mm, 8 mm, 10 mm, 12 mm, or 14 mm or (ii) within a range of 2-14 mm, or other incremental ranges between this range. In some embodiments, the second dimension $D_2$ may correspond to that of the second dimension $D_2$ of the thrombus 120 (FIG. 1B). The third dimension $D_3$ can be (i) at least 2 mm, 4 mm, 6 mm, 8 mm, 10 mm, 12 mm, or 14 mm or (ii) within a range of 2-14 mm, or other incremental ranges between this range. As described in additional detail elsewhere herein (e.g., with reference to FIGS. 2A-2C), the third dimension $D_3$ may be based on the diameter or cross-sectional dimension of the tubes 101 such that the magnetized member surround a portion or an entire circumference of the tubes 101. As shown in FIG. 1C, the lower surface of the magnetized member 140, which corresponds to the third dimension $D_3$, may be curved to match the curvature of the tube that the magnetized member 140 is disposed over. In some embodiments, the lower surface of the magnetized member 140 may be at least partially embedded within a wall of the tube.

As shown in FIG. 1D, the magnetized member 140 can have a cylindrical disk or sleeve shape that includes a first dimension $D_1$ (e.g., a length), a first radius $r_1$ (e.g., an inner radius), and a second radius $r_2$ (e.g., an outer radius). The first dimension $D_1$, first radius $R_1$, and second radius $R_2$ may be chosen to ensure the magnetized member 140 has a sufficient volume and/or amount of magnetic component 142 to provide a magnetic force (e.g., magnetic field effect) above a predetermined threshold. The first dimension $D_1$ can be (i) at least 2 mm, 4 mm, 6 mm, 8 mm, 10 mm, 12 mm, or 14 mm or (ii) within a range of 2-14 mm, or other incremental ranges between this range. In some embodiments, the first dimension $D_1$ may correspond to that of the second dimension $D_2$ of the thrombus 120 (FIG. 1B). The first radius $R_1$ can be (i) at least 1 mm, 2 mm, 3 mm, 4 mm, or 5 mm or (ii) within a range of 1-5 mm, or other incremental ranges between this range. In some embodiments, the first radius $R_1$ may correspond to the radius of the tubes the magnetized member 140 is configured to be disposed around. In such embodiments, the magnetized member 140 shown in FIG. 1D may form a sleeve around or circumscribe a circumference of the tube of the model. The second radius $R_2$ may be at least 1 mm, 2 mm, 3 mm, 4 mm, or 5 mm larger than the first radius $r_1$. In some embodiments, the second radius $R_2$ may be determined based on a desired magnetic force of the magnetized member 140.

Figure 2A:
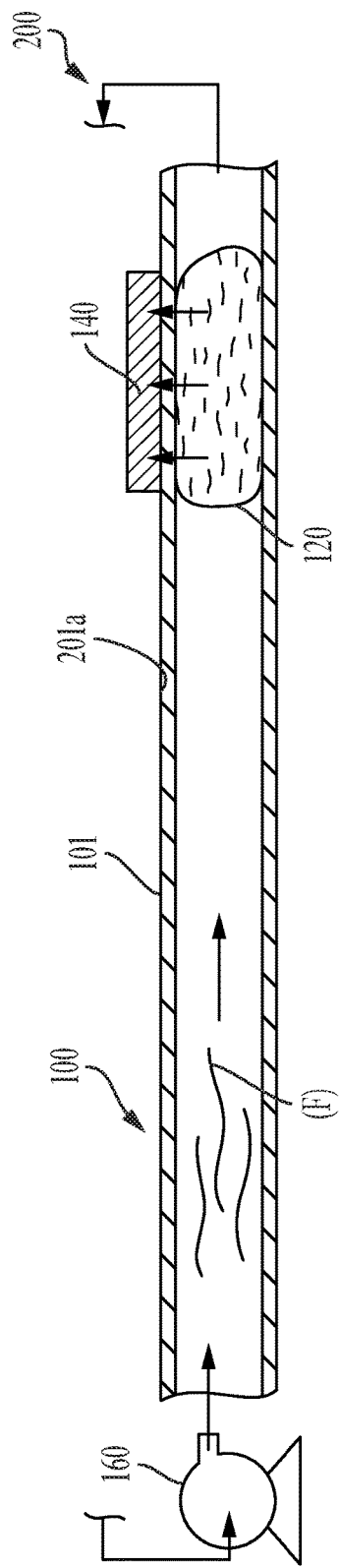
FIGS. 2A-2C illustrate various cross-sectional views of a system including the model, thrombus, and magnetized member of FIGS. 1A-1C, respectively, in accordance with embodiments of the present technology.
Figure 2B:
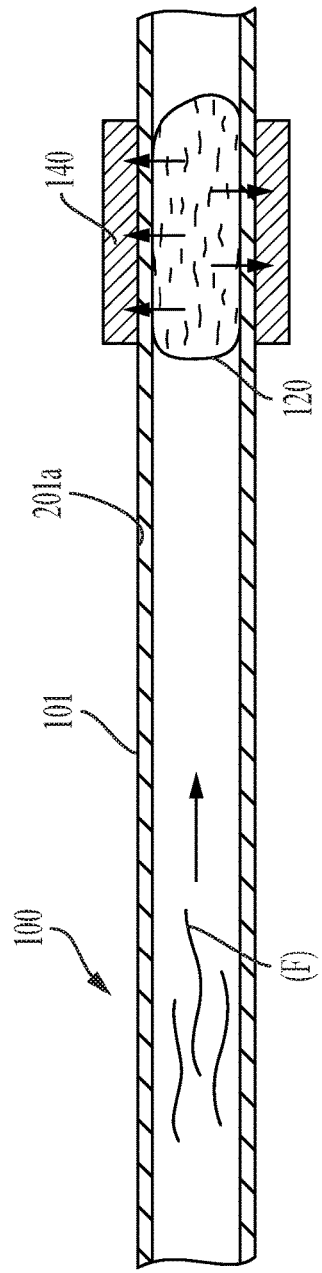
Figure 2C:
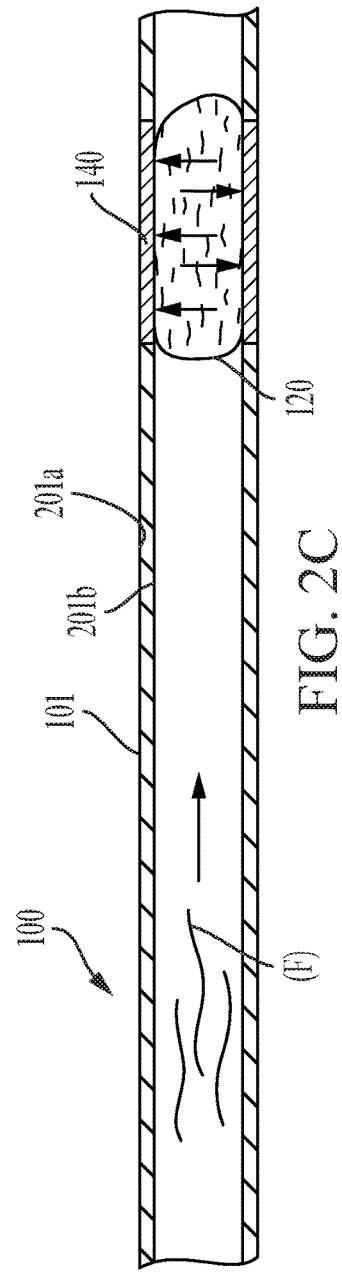

FIGS. 2A-2C illustrate various cross-sectional views of a system 200 including the model 100, thrombus 120, and magnetized member 140 described elsewhere herein, in accordance with embodiments of the present technology. In each of FIGS. 2A-2C, the thrombus 120 is disposed within the tube 101 of the model 100, and the magnetized member 140 is disposed adjacent and/or peripheral to the thrombus 120. For example, the magnetized member 140 may be positioned directly on the tube 101, indirectly on the tube, or at least partially embedded within a wall of the tube. The magnetized member 140 exerts on the magnetic component 121 of the thrombus 120 a radially outward magnetic force in a direction toward the magnetized member 140. As explained elsewhere herein (e.g., with reference to FIGS. 3A-3C), the force exerted on the thrombus 120 via the magnetized member 140 can be above a predetermined threshold (e.g., a minimum magnetic field effect), such that the thrombus 120 remains coupled to the magnetized member 140 when a dislodging force (e.g., provided via the fluid (F), a retrieval device, an aspiration catheter, etc.) is applied on the thrombus 120. Stated differently, the force exerted on the thrombus 120 via the magnetized member 140 is such that the dislodging force is unable to dislodge and uncouple the thrombus 120 therefrom.

As shown in FIG. 2A, the system 200 can include a pump 160 or other device configured to flow fluid (F) through the model 100. In some embodiments, the fluid (F) flows or is recirculated through the tubes 101 of the model 100, and may generally resemble the flow of blood or other bodily fluid through human neurovasculature, e.g., via pulsation and/or fluid pressure profile. As such, the fluid (F) can create an environment that more accurately resembles that of in vivo human vasculature. For example, the pressure and flow of the fluid (F) may resemble the respective blood pressure and/or heart rate of a typical stroke patient. In some embodiments, the fluid (F) may have a pressure of (i) at least 50 millimeters of mercury (mmHg), 75 mmHg, 100 mmHg, 120 mmHg, 140 mmHg, 160 mmHg, or 180 mmHg, or (ii) within a range from 50 mmHg to 180 mmHg, or other incremental ranges between this range. In some embodiments, the pump 160 and/or fluid (F) may be omitted from the system 200. Illustration of the pump 160 has been omitted from FIGS. 2B and 2C for illustrative purposes.

As shown in FIG. 2A, the magnetized member 140 is disposed over (e.g., on) an outermost surface 201a of the tube 101 such that the magnetized member 140 covers or surrounds only a portion of the circumference of the tube 101. Such embodiments may, for example, help create a system that more closely resembles an in vivo clot or occlusive material adhered to only a portion of a blood vessel, as opposed to an entire inner circumference thereof. In some embodiments, the magnetized member 140 may be positioned directly over the outermost surface 201a of the tube 101, or indirectly over the outermost surface 201a such that another material is positioned between the magnetized member 140 and the outermost surface 201a of the tube 101. Increasing the distance between the thrombus 120 and magnetized member 140 be done to decrease the force exerted on the thrombus 120 via the magnetized member 140. As a result of covering only a portion of the outermost surface 201a of the tube 101, and as shown in FIG. 2A, the radially outward force exerted on the thrombus 120 via the magnetized member 140 is applied only in an upward direction.

As shown in FIG. 2B, the magnetized member 140 is disposed over the outermost surface 201a of the tube 101 such that the magnetized member 140 covers or surrounds the entire circumference of the tube 101. Such embodiments may, for example, help create a system that more closely resembles an in vivo clot or occlusive material adhered to the entire inner circumference of a blood vessel, as opposed to only a portion of an entire inner circumference thereof. In some embodiments, the magnetized member 140 may be positioned directly over the outermost surface 201a of the tube 101, or indirectly over the outermost surface 201a such that another material is between the magnetized member 140 and the outermost surface 201a of the tube 101. As a result of covering the entire circumference of the outermost surface 201a of the tube 101, and as shown in FIG. 2B, the radially outward force exerted on the thrombus 120 via the magnetized member 140 is applied uniformly in all radially outward directions.

As shown in FIG. 2C, the magnetized member 140 is disposed within at least a portion of the wall of the tube 101. Stated differently, in the embodiment illustrated in FIG. 2C, the magnetized member 140 is disposed such that at least a portion of the magnetized member 140 is between the outermost surface 201a and innermost surface 201b of the tube 101. In such embodiments, the magnetized member 140 may be disposed such that no portion of the magnetized member 140 protrudes from the outermost surface 201a and/or the innermost surface 201b of the tube 101. In some embodiments, only an outer face or portion (e.g., the portion facing away from the thrombus 120) of magnetized member 140 is exposed through the outermost surface 201b of the tube wall or tube 101. In such embodiments, additional magnetized members may be stacked on the exposed surface, e.g., to increase the radially outward magnetic force exerted on the thrombus 120 via the stacked magnetized members. In some embodiments, the magnetized member 140 may be embedded within the tube material during manufacturing (e.g., during curing), whereas in other embodiments the magnetized member 140 may be disposed within the tube 101 after manufacturing (e.g., after curing thereof).

As shown in FIG. 2C, the magnetized member 140 can surround the entire circumference of the innermost surface 201b of the tube 101. Such embodiments may, for example, help create a system that more closely resembles an in vivo clot or occlusive material that has adhered to the entire inner circumference of a blood vessel, as opposed to only a portion of the inner circumference thereof. As a result of covering the entire inner circumference of the tube 101, and as shown in FIG. 2C, the radially outward force exerted on the thrombus 120 via the magnetized member 140 is applied uniformly in all radially outward directions.

In some embodiments in which at least a portion of the magnetized member 140 is disposed within tube 101, the magnetized member 140 surrounds only a portion of the circumference of the innermost surface 201b of the tube 101. Such embodiments may, for example, help create a system that more closely resembles an in vivo clot or occlusive material that has adhered to a portion of the inner circumference of a blood vessel, as opposed to the entire inner circumference thereof.

Although in the illustrated embodiments of FIGS. 2A-2C the magnetized member 140 exerts a radially outward force on the thrombus 120, in some embodiments the magnetized member 140 can be configured to exert a resistive force on the thrombus 120 along other axes or orientations. For example, in some embodiments, the magnetized member 140 can take the form of a conductive wire extending helically around the tube 101. When electrical current is passed through the conductive wire, a magnetic field oriented along the longitudinal axis of the tube is generated. Such a longitudinally oriented magnetic field can exert a resistive force on the thrombus 120. In some embodiments, the magnetized member 140 can be configured to exert a resistive force on the thrombus 120 along any axes or combination of axes.

In some embodiments, a resistive force can be applied to the thrombus using electrical interactions rather than magnetic. For example, the thrombus 120 can be configured to be negatively charged (e.g., by including negatively charged components within the thrombus 120) and the member 140 can be positively charged (e.g., by being coupled to a power supply or current generator, or by including positively charged components within the member 140). In operation, such an electrically charged member 140 can exert an attractive force on the electrically charged thrombus 120, thereby increasing the force required to dislodge the thrombus 120 from within the tube 101. In some embodiments, a combination of electrical/electrostatic and magnetic forces can be used to increase the resistance of the thrombus 120 to dislodgement from within the tube 101.

Embodiments of the present disclosure have multiple advantages over conventional vasculature models and related systems. For example, embodiments of the present disclosure can be more representative of the in vivo interaction between clots and vessel walls, which thereby enables a more accurate simulation of medical procedures to be later conducted in vivo in actual patients. Stated differently, the magnetic force exerted via a magnetized member on a synthetic thrombus can resemble the interaction (e.g., the bonding strength) between an in vivo clot or occlusive material and vessel wall. Moreover, the strength of the in vitro interaction between the synthetic thrombus and tube wall, or the amount of force needed to dislodge the synthetic thrombus from the tube wall, can be increased or decreased to resemble that of a particular occlusive material or medical application. For example, as explained elsewhere herein, this force may be increased by varying the material, amount of iron present in the magnetizing member and/or synthetic thrombus, by increasing the magnetic field generated by an electromagnet, and/or decreasing the distance between the synthetic thrombus and magnetized member, amongst other options.

Another advantage of embodiments of the present disclosure is that the models described herein can be used multiple times without incurring damage. That is, the models of the present disclosure can be practiced on over multiple passes without incurring damage to the tubes of the model. As such, the models and/or tubes of the models do not need to be replaced after each use. This is in part due to the use of magnetic forces (as opposed to the use of couplings or adhesives), which enable the synthetic thrombus to be decoupled from the magnetized member without causing damage to portions of the tube where the magnetized member is positioned.

Figure 3A:
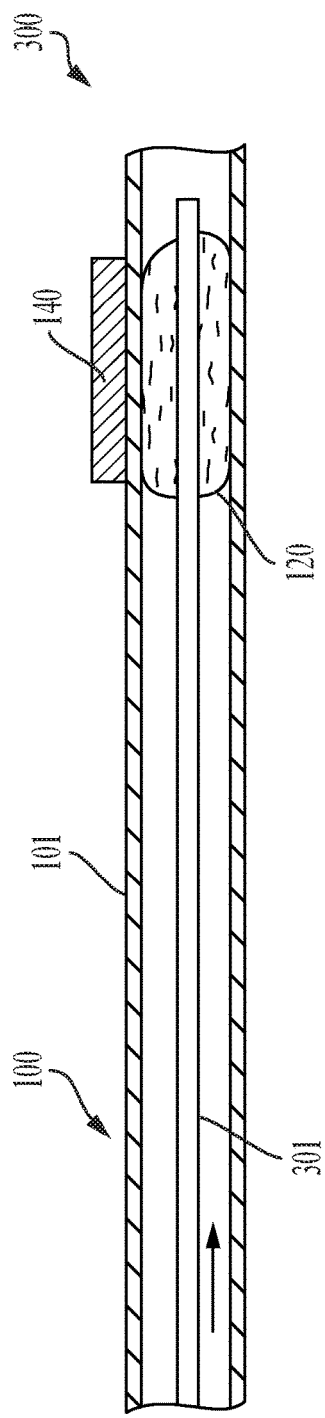
FIGS. 3A-3C illustrate an in vitro method for removing a synthetic thrombus from a model, in accordance with embodiments of the present technology.
Figure 3B:
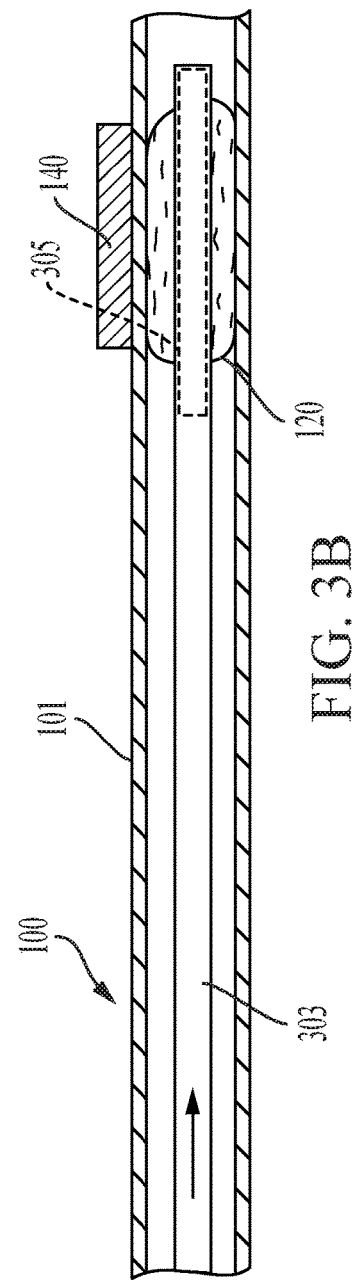
Figure 3C:
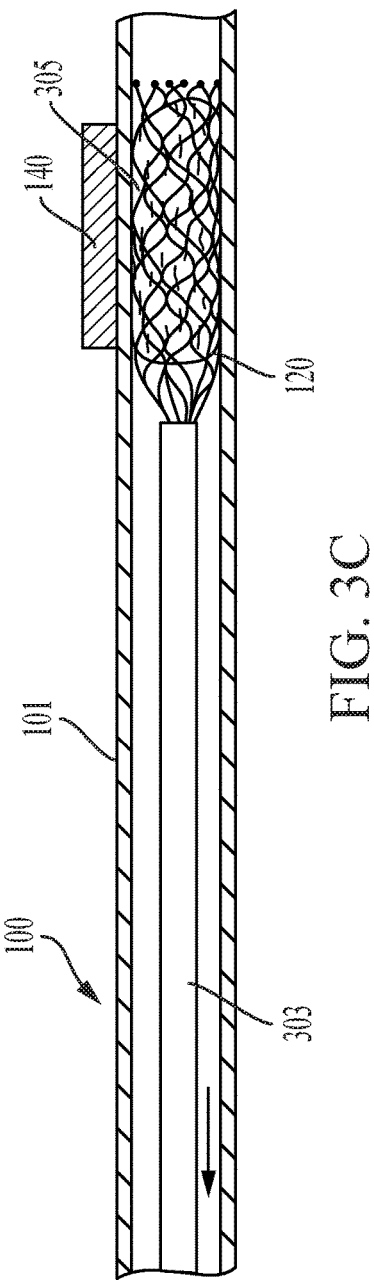

FIGS. 3A-3C illustrate an in vitro method 300 for removing a synthetic thrombus 120 from a model 100 using a clot retrieval device, in accordance with embodiments of the present technology. The embodiment illustrated in FIGS. 3A-3C corresponds to that of FIG. 2A, in which the magnetized member 140 is positioned over only a portion of the tube 101. In other embodiments, any of the magnetized members 140 described elsewhere herein may be utilized to carry out the method 300 described below. As shown in FIG. 3A, a guidewire 301 may be advanced through the tube 101 of the model 100 and through the thrombus 120 such that a distal terminus of the guidewire 301 is distal of the thrombus 120. As the guidewire 301 is advanced through the thrombus 120, the thrombus 120 remains magnetically coupled to the magnetized member 140 such that the thrombus 120 is not substantially dislodged from its original position. Next, a delivery catheter 303 may be delivered over the guidewire 301 so that a distal portion of the delivery catheter 303 is positioned at or near the thrombus 120. As shown in FIG. 3B, in some embodiments, the delivery catheter 303 may be advanced over the guidewire 301 through the thrombus 120 such that a distal terminus of the delivery catheter 303 is distal of the thrombus 120. Again, the thrombus 120 remains magnetically coupled to the magnetized member 140 substantially in its original position. With the delivery catheter 303 in position, the guidewire 301 may be withdrawn. A clot retrieving device 305 ("device 305") may then be advanced through the delivery catheter 303 in a low-profile configuration (shown schematically in FIG. 3B) and then released such that the device 305 expands, as shown in FIG. 2C. As the device 305 expands, the device 305 engages and/or secures the thrombus 120 and, by applying a proximal force on device 305, the device 305 exerts a dislodging force on the thrombus 120. Medical procedures and/or devices similar to those utilized in method 300 can be repeated multiple times to simulate and/or test the efficacy thereof.

Figure 4A:
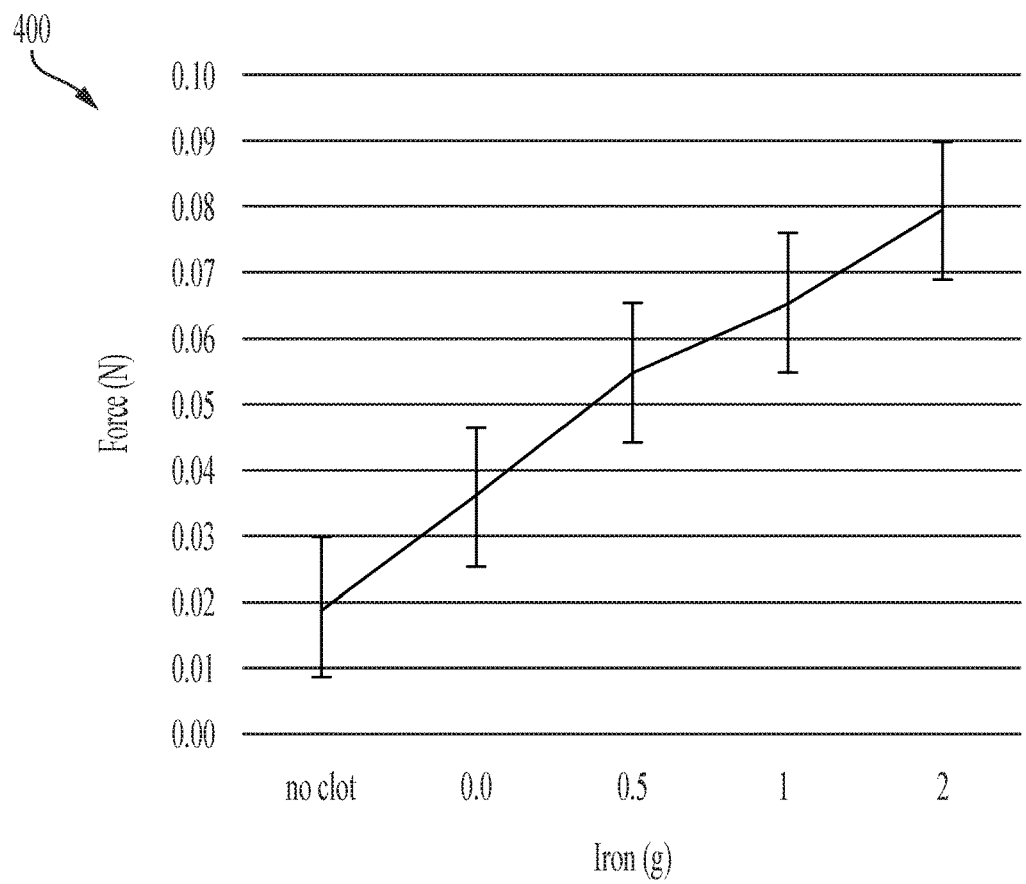
FIGS. 4A and 4B are graphs illustrating the amount of force required to dislodge a synthetic thrombus from a magnetized member based on the amount of iron in the thrombus.
Figure 4B:
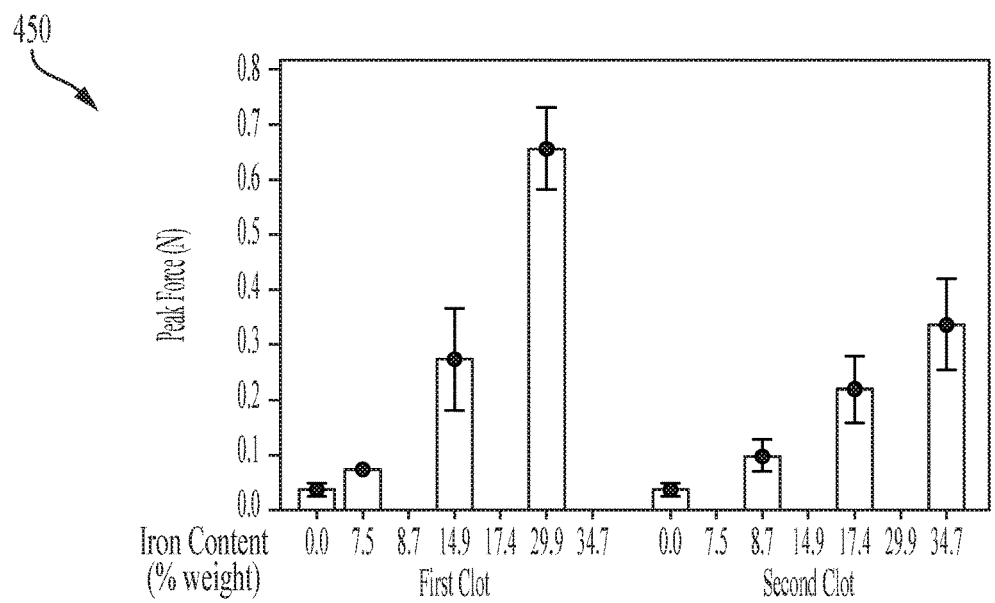

FIGS. 4A and 4B are plots illustrating the amount of force required to dislodge a synthetic thrombus from a tube including a magnetized member based on the amount of iron in the thrombus. As shown in FIG. 4A, the amount of iron present in the synthetic thrombus (e.g., the thrombus 120 described elsewhere herein) varied from 0 g, 0.5 g, 1.0 g, and 2 g of iron powder. The results shown in the plot 400 were generated by measuring the minimum amount of force needed to retract a clot retrieval device from within the tube lumen, thereby dislodging the different synthetic thrombi from the magnetized member. In the "no clot" condition, a clot retrieval device was retracted from the tube lumen without any clot present. In the remaining conditions, the clot retrieval device was deployed and engaged with the thrombus, and then retracted from within the tube lumen. As shown in FIG. 4A, there is a direct correlation between the amount of iron powder present in the synthetic thrombus and the minimum amount of force needed to dislodge the synthetic thrombus from the tube lumen at a position adjacent the magnetized member. Specifically, the synthetic thrombus with 2.0 grams of iron powder required about 0.08 Newtons (N) of dislodging force, the synthetic thrombus with 1.0 grams of iron powder required about 0.065 N of dislodging force, the synthetic thrombus with 0.5 grams of iron powder required about 0.055 Newtons (N) of dislodging force, and the synthetic thrombus with 0.0 grams of iron powder required about 0.035 N of dislodging force. In view of the results shown in the graph 400, the amount of iron powder present in the synthetic thrombus may be varied to achieve a desired dislodging force.

The plot 450 shown in FIG. 4B illustrates the amount of force required to dislodge a synthetic thrombus from a tube including a magnetized member based on the weight percent of iron in the thrombus. As shown in FIG. 4B, tests were conducted using a first synthetic thrombus (e.g., a firm thrombus) and a second synthetic thrombus (e.g., a soft thrombus). The first thrombus had a higher amount of fibrinogen than that of the second thrombus, which caused the first thrombus to have a relatively higher compression modulus and be generally stiffer. The weight percent of iron (e.g., ferric oxide particles) for the first thrombus was varied from 0.0 to 7.5 to 14.9 to 29.9, and the weight percent or iron for the second thrombus was varied from 0.0 to 8.7 to 17.4 to 34.7. As shown in FIG. 4B, there is a direct correlation for the first and second thrombi between the weight percent of iron present and the amount of force needed to dislodge the thrombi from the tube lumen. Additionally, the amount of fibrinogen present in the thrombi is directly correlated to the amount of force needed to dislodge the thrombi. For example, at 14.9 iron weight percent approximately 0.27 Newtons were needed to dislodge the first thrombus, whereas at 17.4 iron weight percent approximately 0.23 Newtons were needed to dislodge the second thrombus. Additionally, the increase in forced needed to dislodge the first thrombus relative to the iron weight percent increased at a faster, more exponential rate relative to that of the second thrombus, which increased more linearly relative to the iron weight percent.

CONCLUSION

Although many of the embodiments are described above with respect to systems and methods related to vasculature models, the technology is applicable to other applications and/or other approaches. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-4.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

Unless otherwise indicated, all numbers expressing concentrations, weights, magnetic field strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:
1. A neurovasculature model, comprising:
   a tube including a lumen extending therethrough;
   a synthetic thrombus sized to be positioned within the lumen of the tube, the thrombus including a magnetic component; and
   a magnetized member positioned adjacent the thrombus and peripheral to the lumen, the magnetized member being configured to exert a radially outward magnetic force on the thrombus.
2. The model of claim 1, wherein the thrombus is secured to the tube via the magnetized member such that the thrombus can withstand a dislodging force of at least 0.05 Newtons.
3. The model of claim 1, wherein the tube comprises silicone and is part of a plurality of tubes having a tortuous configuration.
4. The model of claim 1, wherein at least a portion of the magnetized member is positioned within a tube wall of the tube such that no portion of the magnetized member protrudes therefrom.

5. The model of claim 1, wherein the magnetized member is positioned on the tube such that the magnetized member surrounds at least a portion of a circumference of the tube.

6. The model of claim 1, wherein the magnetic component is one of a plurality of magnetic components comprising iron powder.

7. The model of claim 1, wherein the magnetized member has a magnetic field of at least 5 milliteslas.

8. The model of claim 1, wherein the magnetic component comprises at least 2.0 grams of iron powder.

9. The model of claim 1, wherein the thrombus comprises at least two or more of (i) animal bodily fluid, (ii) thrombin, or (iii) fibrinogen and/or fibrin.

10. A system for simulating or testing a medical procedure, comprising:
    a tube having a lumen extending therethrough;
    a synthetic thrombus configured to be positioned within the lumen at a target site, the thrombus including a magnetic component; and
    a magnetized member configured to be disposed on or at least partially within the tube such that a radially outward force is exerted on the magnetic component via the magnetized member.

11. The system of claim 10, further comprising a pump configured to circulate fluid through the lumen of the tube.

12. The system of claim 10, wherein the tube comprises silicone and is part of a plurality of tubes having a tortuous configuration.

13. The system of claim 10, wherein the magnetized member is disposed over an outermost surface of the tube.

14. The system of claim 13, wherein the magnetized member is disposed around an outermost surface of the tube.

15. The system of claim 10, wherein at least a portion of the magnetized member is disposed within a wall of the tube.

16. A method for simulating or testing a medical procedure, comprising:
    providing a tube having a lumen extending therethrough;
    positioning a synthetic thrombus within the lumen at a target site, the thrombus including a magnetic component; and
    applying a magnetic field to the thrombus such that the thrombus is secured at the target site via the applied magnetic field.

17. The method of claim 16, wherein applying the magnetic field comprises applying the magnetic field via a magnetized member disposed over at least a portion of the tube at the target site.

18. The method of claim 16, further comprising:
    flowing fluid through the lumen via a pump; and
    withstanding a dislodging force provided via the flowing fluid such that the thrombus remains secured at the target site.

19. The method of claim 18, wherein the dislodging force is at least 0.05 Newtons.

20. The method of claim 16, wherein the thrombus substantially occludes the lumen of the tube, the method further comprising removing the thrombus from the tube via a retrieval device.

* * * * *